US008112485B1

(12) United States Patent
Cooley et al.

(10) Patent No.: US 8,112,485 B1
(45) Date of Patent: Feb. 7, 2012

(54) TIME AND THRESHOLD BASED WHITELISTING

(75) Inventors: Shaun Cooley, El Segundo, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1100 days.

(21) Appl. No.: 11/562,948

(22) Filed: Nov. 22, 2006

(51) Int. Cl.
*G06F 15/16* (2006.01)

(52) U.S. Cl. ........................................ 709/206; 709/219

(58) Field of Classification Search ........... 709/201–207
See application file for complete search history.

(56) References Cited

U.S. PATENT DOCUMENTS

2005/0080857 A1* 4/2005 Kirsch et al. .................. 709/206
2005/0204012 A1* 9/2005 Campbell ..................... 709/206

* cited by examiner

*Primary Examiner* — Ian N Moore
*Assistant Examiner* — Afshawn Towfighi
(74) *Attorney, Agent, or Firm* — Brill Law Office; Jeffrey Brill

(57) ABSTRACT

In response to a user sending an electronic mail message to a recipient, a whitelist manager creates a temporary whitelist entry for the recipient on the user's whitelist. The temporary whitelist entry is set to expire after a set period of time. During the period of time that the temporary whitelist entry is in effect, electronic mail messages from the recipient are passed to the user without being subject to security screening. The whitelist manager keeps track of email traffic between the user and the recipient during this time period. If the nature of this email traffic is sufficient to establish that the recipient is legitimate, the whitelist manager converts the temporary entry to a permanent one. Otherwise, the whitelist manager disables the temporary entry, after which email from the recipient to the user is subject to normal security processing.

18 Claims, 3 Drawing Sheets

TIME AND THRESHOLD BASED WHITELISTING

TECHNICAL FIELD

This invention pertains generally to computer security, and more specifically to automatically creating whitelists of trusted email addresses.

BACKGROUND

Current email systems typically include whitelists of trusted email addresses and domains. An incoming email from a whitelisted entry is presumed to be legitimate, and is therefore delivered to the addressee without being subject to scanning for spam or other processing to check for malicious email. Checking for spam and other security processing consumes both time and computing resources, so it is desirable to be able to bypass it when email is known to be legitimate.

Currently available automated whitelisting techniques use very simple mechanisms, such as adding all parties to whom a user sends email to a whitelist. Whitelists created this way often include entries that are not truly legitimate. For example, a user might send an email to a business from whom the user does not wish to receive automatically generated commercial emails. The user might even send an email requesting to be removed from an email list. Clearly, in situations such as these, the user does not want the recipient added to the whitelist. These currently available simple whitelisiting mechanisms also lead to the creation of very large whitelists that are typically very difficult and time consuming for users to manage. This problem becomes much worse when these simple mechanisms are applied for multiple users at a gateway or domain level.

What is needed are methods, computer readable media and computer systems for automatically creating smaller, more manageable and more pertinent whitelists.

SUMMARY

A whitelist manager creates temporary whitelist entries based on initial evidence that an email recipient is legitimate, and only converts the temporary entries to permanent ones upon finding sufficient additional evidence of the recipient's legitimacy within a set period of time. In response to a user sending an electronic mail message to a recipient, the whitelist manager creates a temporary whitelist entry for the recipient on the user's whitelist. The temporary whitelist entry is set to expire after a set period of time. During the period of time that the temporary whitelist entry is in effect, electronic mail messages from the recipient are passed to the user without being subject to security screening. The whitelist manager keeps track of email traffic between the user and the recipient during this time period. If the nature of this email traffic is sufficient to establish that the recipient is legitimate, the whitelist manager converts the temporary whitelist entry to a permanent one. Otherwise, the whitelist manager disables the temporary entry, after which email from the recipient to the user is subject to normal security processing. This functionality can also be applied at a domain and/or gateway level.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
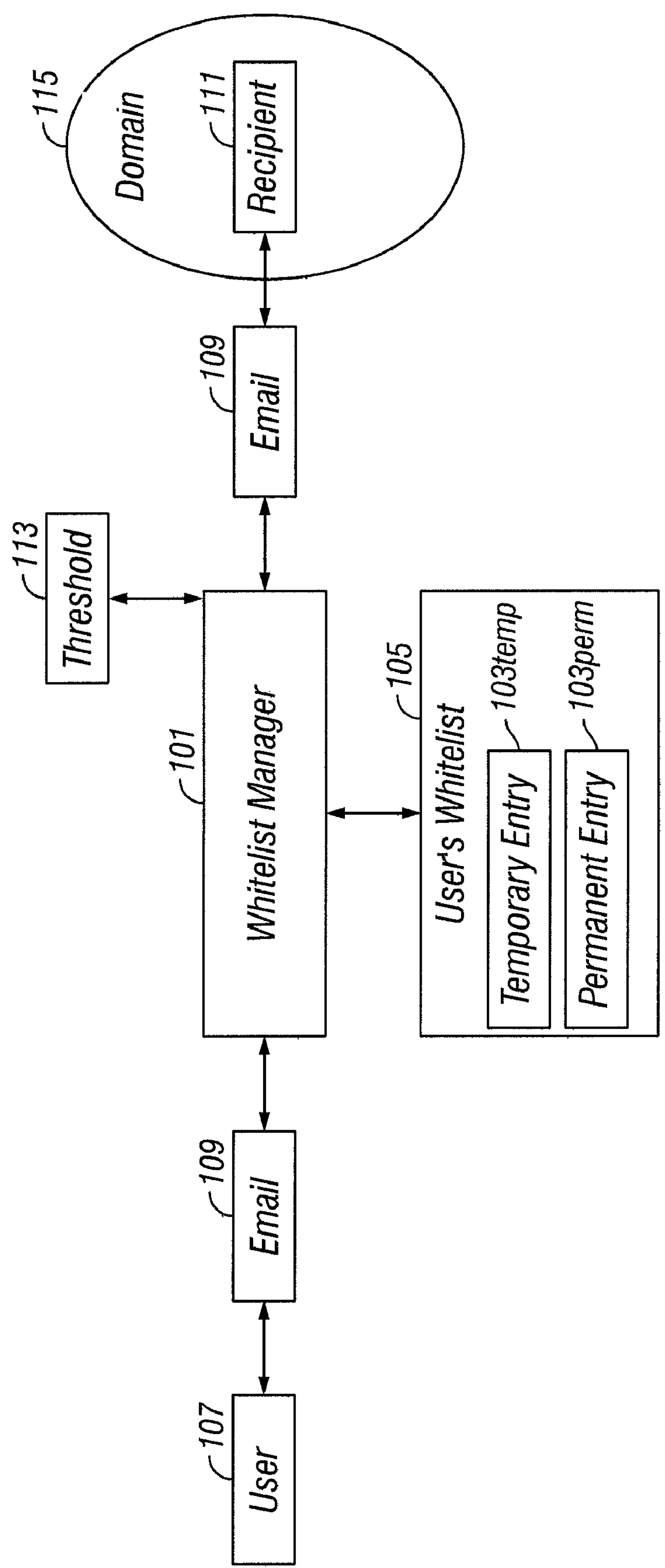
FIG. 1 is a block diagram illustrating the operation of a whitelist manager, according to some embodiments of the present invention.

FIG. 1 illustrates a whitelist manager 101, according to some embodiments of the present invention. It is to be understood that although the whitelist manager 101 is illustrated as a single entity, as the term is used herein a whitelist manager 101 refers to a collection of functionalities which can be implemented as software, hardware, firmware or any combination of these. Where a whitelist manager 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

The whitelist manager 101 improves automatic whitelist 105 maintenance by using time and communication based logic. As illustrated in FIG. 1, in response to a user 107 sending an email 109 to a recipient 111, the whitelist manager 101 initially creates a temporary whitelist 103 entry 103 temporary temporary for the recipient 111 which expires after a set period of time. For example, suppose a user 107 joe@examplesite.com sends an email 109 to a destination 111 bob@hotmail.com. Instead of permanently whitelisting the addressee 111 (bob@hotmail.com), the whitelist manager 101 adds a temporary entry $\mathbf{103}_{temporary}$ to the whitelist 105 for bob@hotmail.com. The temporary entry $\mathbf{103}_{temporary}$ expires after a certain period of time (for example, 72 hours). It is to be understood that 72 hours is simply an example, and the amount of time until temporary entries $\mathbf{103}_{temporary}$ expire is a variable design parameter. In some embodiments, different times can be set for different temporary entries $\mathbf{103}_{temporary}$ based on the circumstances and/or user 107 or system administrator preference.

If bob@hotmail.com replies during those 72 hours, the whitelist manager 101 will note the associated temporary entry $\mathbf{103}_{temporary}$ in the whitelist 105 and pass the email 109 to the user 107 joe@examplesite.com without any security screening. However, since the temporary entry $\mathbf{103}_{temporary}$ is only in effect for 72 hours, unless it is made permanent (this process is described below), if bob@hotmail.com replies after the 72 hour window, his email 109 will be subjected to whatever spam and other email 109 security filtering is in place for the user 107 (e.g., as configured by the system administrator for Examplesite).

The whitelist manager 101 converts time based whitelist entries $\mathbf{103}_{temporary}$ permanent entries $\mathbf{103}_{permanent}$ where appropriate. This can be done in any number of ways as desired. Generally, the whitelist manager 101 establishes "thresholds" 113 for a number of relevant attributes, such that when a threshold 113 is crossed the whitelist manager 101 converts the associated temporary, time based entry $\mathbf{103}_{temporary}$ to a permanent entry $\mathbf{103}_{permanent}$. Such threshold 113 criteria can, for example, include: the total number of messages 109 sent by the user 107 to a temporary whitelist entry $\mathbf{103}_{temporary}$; the total number of messages 109 sent by the user 107 to a temporary entry $\mathbf{103}_{temporary}$ that are over a specific length (e.g., only count messages 109 with more than 20 words); the total number of words sent by the user 107 to the temporary entry $\mathbf{103}_{temporary}$; more than N messages 109 being sent by the user 107 to the temporary entry $\mathbf{103}_{temporary}$ in less than a given time period; the total number of bi-directional message 109 exchanges (related send-response pairs or email 109 threads greater than N messages 109) between the user 107 and the temporary entry $\mathbf{103}_{temporary}$; more than N bi-directional exchanges in less than a given time period; the number of total entries 103 that are already on the user's 107 whitelist 105; etc. Of course, the specific criteria to examine and the threshold values 113 to use are variable design parameters that can be adjusted and set as desired. In some embodiments, default values are preconfigured. In some embodiments, users 107 and/or system administrators (not illustrated) can enter, configure and edit these values.

In some embodiments, the whitelist manager 101 converts an entry 103 from temporary to permanent where only one threshold 113 is met, whereas in other embodiments only where multiple and/or specific combinations are met. At a general level, the whitelist manager 101 examines email 109 activity during the life of a temporary entry $\mathbf{103}_{temporary}$ looking for evidence that the temporary entry $\mathbf{103}_{temporary}$ is truly legitimate. Where such evidence is found, the temporary entry $\mathbf{103}_{temporary}$ is converted to permanent. Where a temporary entry $\mathbf{103}_{temporary}$ does not meet the criteria to be converted to permanent before it expires, the whitelist manager 101 disables the temporary entry $\mathbf{103}_{temporary}$. Then, subsequent emails 109 originating from the associated addressee 111 are subject to standard security screening.

The whitelist manager 101 can also apply this functionality to entire domains 115. For example, if the whitelist manager 101 converts temporary entries 103 temporary temporary for more than N users at a single domain 115 to permanent entries $\mathbf{103}_{permanent}$ on a given user's 107 whitelist 105, then the whitelist manager 101 could automatically enter the entire domain 115 as a permanent whitelist entry $\mathbf{103}_{permanent}$. At a gateway level (not illustrated), the whitelist manager 101 can apply a threshold 113 rule such that if the whitelist manager 101 has converted more than N temporary entries $\mathbf{103}_{temporary}$ at a single domain 115 to permanent $\mathbf{103}_{temporary}$ entries $\mathbf{103}_{permanent}$ for the various local users 107 associated with the gateway as a group, then the whitelist manager 101 adds the entire domain 115 as a permanent whitelist entry $\mathbf{103}_{permanent}$ to the whitelist 105 of each of the local users 107. Certain very large, public domains 115 (e.g., Hotmail, Yahoo, AOL, Gmail, etc.) could be excluded from this type of blanket whitelisting. These blanket domain 115 rules would also typically not be applied on gateways handling traffic for a very large group of unrelated users 107 (e.g., Hotmail or GMail). It is to be further understood that as with the threshold 113 rules for individual users 107, the specific criteria to monitor and the threshold values 113 to use at domain 115 and gateway levels are variable design parameters that can be adjusted and set as desired.

Figure 2:
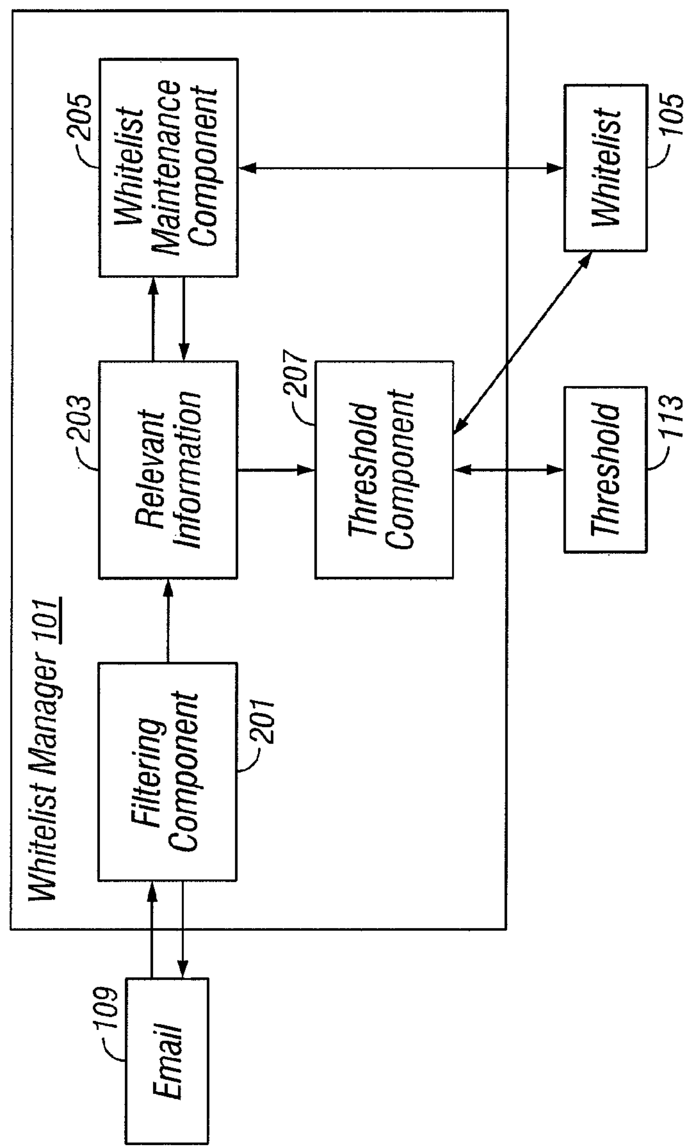
FIG. 2 is a block diagram illustrating components of a whitelist manager, according to some embodiments of the present invention.

FIG. 2 illustrates specific components utilized by the whitelisting manager 101, according to some embodiments of the present invention. It is to be understood that the illustrated components simply represent certain functionalities performed by the whitelisting manager 101, as per some embodiments of the present invention. The specific division of the functionalities into components as illustrated and described in conjunction with FIG. 2 serves as an example only. It will be apparent to those of ordinary skill in the relevant art in light of this specification that other divisions and implementations are possible, and are within the scope of the present invention.

As illustrated in FIG. 2, a filtering component 201 of the whitelist manager 101 filters incoming and outgoing email messages 109 so that the emails 109 can be further analyzed. As the term is used herein, filtering email messages 109 simply refers to identifying incoming and outgoing email messages 109 and processing them in some way before the messages 109 arrive at their destination 111. Various mechanisms are known by those of ordinary skill in the art for filtering an email 109 stream, all of which can be used within the context of the present invention. For example, anything from a plug-in to a simple mail transfer protocol server to a proxy server or a gateway can be used for message 109 filtering. So as not to distract from the explanation of the functionality of interest, these specific instantiations of the filtering component 201 are not separately illustrated.

When an outbound email message 109 is captured by the filtering component 201, relevant information 203 is extracted from the message 109, such as, e.g., sender 107, recipient 111, time, word count, is the message 109 a response, email 109 thread identification and length, is the message 109 being forwarded, etc. This information 203 is passed to the whitelist maintenance component 205, for storage and for analysis characterization of messages 109 (described below).

The filtering component 201 also extracts relevant information 203 from inbound email messages 109, in order to allow tracking and updating of statistics such as thread identification, bi-directional exchange identification and count, number of other recipients 111 that are already on the user's 107 whitelist 105, etc. This information 203 is also passed to the whitelist maintenance component 205.

The whitelist maintenance component 205 receives the relevant information 203 from the filtering component 201, and maintains the whitelists 105 of one or more users 107. When the whitelist maintenance component 205 receives the information 203 extracted from an outbound email 109, it determines whether a permanent whitelist entry 103 permanent permanent already exists for the addressee 111. If so, it has nothing further to do in this case. If a permanent whitelist entry $\mathbf{103}_{permanent}$ for the addressee 111 is not found, the whitelist maintenance component 205 creates a temporary whitelist 103 entry $\mathbf{103}_{temporary}$ for the addressee 111, which is set to expire after a given period of time. The temporary whitelist entry $\mathbf{103}_{temporary}$, if it is not the first one created for this recipient 111 in this user's 107 whitelist 105, serves as a placeholder until the existing temporary entry $\mathbf{103}_{temporary}$ has been promoted or disabled. In some embodiments, when multiple temporary whitelist entries $\mathbf{103}_{temporary}$ are created for a single recipient 111, each separate temporary entry $\mathbf{103}_{temporary}$ expires separately, after the requisite amount of time from its creation has passed (unless the recipient 111 is permanently whitelisted, in which case the user's whitelist

105 is updated with a single permanent entry $\mathbf{103}_{permenent}$ for the recipient 111). In other embodiments, the temporary status of the whitelisting of the recipient 111 expires after the requisite amount of time has passed from the creation of the first temporary entry $\mathbf{103}_{temporary}$, unless the recipient 111 meets the terms for permanent whitelisting within that time period.

The whitelist maintenance component 205 also adds the message statistics 203 to the running totals for the user 107 (e.g., how many messages 109 sent to recipient 111 in given period of time, etc.) In one embodiment, the whitelist maintenance component 205 simply maintains running total information per user 107. In another embodiment, full per message statistics 203 are maintained.

The whitelist maintenance component 205 also checks for expired temporary entries $\mathbf{103}_{temporary}$ and disables them. In some embodiments, disabled entries $\mathbf{103}_{temporary}$ are stored for a period of time (e.g., 30 days, depending on factors such as message 109 volume, storage capacity, user 107 and/or administrator preference, etc.). In other embodiments, the whitelist maintenance component 205 simply deletes expired temporary entries $\mathbf{103}_{temporary}$ in order to disable the them. These functions can be performed as one or more scheduled task(s) and/or in real-time.

Figure 3:
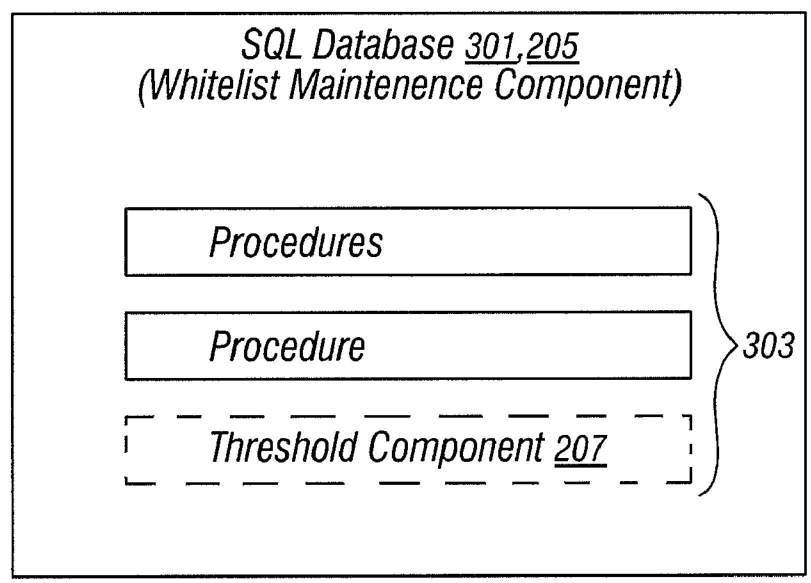
FIG. 3 is a block diagram illustrating components of a whitelist manager instantiated in the form of a database, according to some embodiments of the present invention.

As illustrated in FIG. 3, in some embodiments the whitelist maintenance component 205 is instantiated as a System Query Language (SQL) or similar database 301. In such embodiments, the database 301 typically includes one or more stored procedure(s) 303 for handling expiration management and removal of disabled entries $\mathbf{103}_{temporary}$. Of course, non-database instantiations of the maintenance component 205 are also possible and within the scope of the present invention.

Returning to FIG. 2, a threshold component 207 receives the statistical information 203 from the maintenance component 205, and analyzes the information 203 from the point of view of temporary entry $\mathbf{103}_{temporary}$ promotion. In embodiments where the maintenance component 205 is implemented as an SQL database 301, the threshold component 207 can be implemented as a stored procedure 303 thereof (illustrated in FIG. 3). The threshold component 207 examines non-expired temporary whitelist entries $\mathbf{103}_{temporary}$ and the corresponding information 203, in order to identify instances where corresponding message statistics 203 exceed the relevant threshold(s) 113 for promotion. When a complying temporary entry $\mathbf{103}_{temporary}$ is found, the threshold component promotes it to a permanent entry $\mathbf{103}_{permenent}$.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for managing electronic mail message whitelists, the method comprising the steps of:

monitoring incoming and outgoing electronic messages, by a computer;

responsive to detecting an outgoing electronic message from a user to a recipient, adding a temporary whitelist entry for the recipient to a whitelist of the user by a computer, the temporary whitelist entry being set to automatically expire after a set period of time;

delivering electronic messages from the recipient to the user without any security screening during the set period of time prior to the automatic expiration of the temporary whitelist entry, by a computer;

analyzing electronic mail message traffic between the user and the recipient during the set period of time prior to the automatic expiration of the temporary whitelist entry, by a computer;

responsive to results of analyzing the electronic mail message traffic between the user and the recipient during the set period of time prior to the expiration of the temporary whitelist entry, determining whether to transform the temporary whitelist entry into a permanent whitelist entry and continue to deliver electronic messages from the recipient to the user without any security screening, by a computer; and performing an additional step transforming the status of the temporary whitelist entry, by a computer.

2. The method of claim 1 further comprising:

determining, by a computer, whether the electronic mail message traffic between the user and the recipient during the set period of time prior to the expiration of the temporary whitelist entry meets set conditions; and performing a step from a group of steps consisting of:

- responsive to determining that the electronic mail message traffic between the user and the recipient during the set period of time prior to the expiration of the temporary whitelist entry meets the set conditions, transforming the temporary whitelist entry to a permanent whitelist entry by a computer; and
- responsive to determining that the electronic mail message traffic between the user and the recipient during the set period of time prior to the expiration of the temporary whitelist entry does not meet the set conditions, transforming, by a computer, the temporary whitelist entry into a disabled whitelist entry, by a computer, such that the entry is no longer on the whitelist.

3. The method of claim 2 wherein determining, by a computer, whether the electronic mail message traffic between the user and the recipient during the set period of time prior to the expiration of the temporary whitelist entry meets the set conditions further comprises:

determining, by a computer, whether the electronic mail message traffic between the user and the recipient during the set period of time prior to the expiration of the temporary whitelist entry meets at least one threshold value.

4. The method of claim 1 further comprising:

responsive to determining, by a computer, that electronic mail message traffic between the user and multiple recipients at a single domain meets set conditions, adding a permanent whitelist entry for the entire domain to the user's whitelist, by a computer.

5. The method of claim 4 wherein determining, by a computer, that electronic mail message traffic between the user and multiple recipients at the single domain meets the set conditions further comprises:

determining, by a computer, that electronic mail message traffic between the user and multiple recipients at the single domain meets at least one threshold value.

6. The method of claim 1 further comprising:

responsive to determining, by a computer, that electronic mail message traffic between multiple users associated with a gateway and multiple recipients at a single domain meets set conditions, adding a permanent whitelist entry for the entire domain to the whitelist of each user associated with the gateway, by a computer.

7. The method of claim 6 wherein determining, by a computer, that electronic mail message traffic between multiple users associated with the gateway and multiple recipients at the single domain meets the set conditions further comprises:

determining, by a computer, that electronic mail message traffic between multiple users associated with the gateway and multiple recipients at the single domain meets at least one threshold value.

8. The method of claim 1 further comprising:

during the set period of time prior to the expiration of the temporary whitelist entry, responsive to the presence of the temporary whitelist entry in the user's whitelist, passing, by a computer, any electronic mail messages from the recipient to the user without any security screening.

9. The method of claim 1 further comprising:

responsive to the absence of a whitelist entry for a source in a user's whitelist, subjecting, by a computer, any electronic mail messages from that source to the user to security screening.

10. At least one non-transitory computer readable medium containing a computer program product for managing electronic mail message whitelists, the computer program product comprising:

program code for monitoring incoming and outgoing electronic messages;

program code for, responsive to detecting an outgoing electronic message from a user to a recipient, adding a temporary whitelist entry for the recipient to a whitelist of the user, the temporary whitelist entry being set to automatically expire after a set period of time;

program code for delivering electronic messages from the recipient to the user without any security screening during the set period of time prior to the automatic expiration of the temporary whitelist entry;

program code for analyzing electronic mail message traffic between the user and the recipient during the set period of time prior to the automatic expiration of the temporary whitelist entry;

program code for, responsive to results of analyzing the electronic mail message traffic between the user and the recipient during the set period of time prior to the expiration of the temporary whitelist entry, determining whether to transform the temporary whitelist entry into a permanent whitelist entry and continue to deliver electronic messages from the recipient to the user without any security screening; and performing an additional step transforming the status of the temporary whitelist entry.

11. The computer program product of claim 10 further comprising:

program code for determining whether the electronic mail message traffic between the user and the recipient during the set period of time prior to the expiration of the temporary whitelist entry meets set conditions; and program code for performing a step from a group of steps consisting of:

responsive to determining that the electronic mail message traffic between the user and the recipient during the set period of time prior to the expiration of the temporary whitelist entry meets the set conditions, converting the temporary whitelist entry to a permanent whitelist entry; and responsive to determining that the electronic mail message traffic between the user and the recipient during the set period of time prior to the expiration of the temporary whitelist entry does not meet the set conditions, disabling the temporary whitelist entry.

12. The computer program product of claim 11 wherein the program code for determining whether the electronic mail message traffic between the user and the recipient during the set period of time prior to the expiration of the temporary whitelist entry meets the set conditions further comprises:

program code for determining whether the electronic mail message traffic between the user and the recipient during the set period of time prior to the expiration of the temporary whitelist entry meets at least one threshold value.

13. The computer program product of claim 10 further comprising:

program code for, responsive to determining that electronic mail message traffic between the user and multiple recipients at a single domain meets set conditions, adding a permanent whitelist entry for the entire domain to the user's whitelist.

14. The computer program product of claim 13 wherein the program code for determining that electronic mail message traffic between the user and multiple recipients at the single domain meets the set conditions further comprises:

program code for determining that electronic mail message traffic between the user and multiple recipients at the single domain meets at least one threshold value.

15. The computer program product of claim 10 further comprising:

program code for responsive to determining that electronic mail message traffic between multiple users associated with a gateway and multiple recipients at a single domain meets set conditions, adding a permanent whitelist entry for the entire domain to the whitelist of each user associated with the gateway.

16. The computer program product of claim 15 wherein the program code for determining that electronic mail message traffic between multiple users associated with the gateway and multiple recipients at the single domain meets the set conditions further comprises:

program code for determining that electronic mail message traffic between multiple users associated with the gateway and multiple recipients at the single domain meets at least one threshold value.

17. The computer program product of claim 10 further permanent comprising:

program code for, during the set period of time prior to the expiration of the temporary whitelist entry, responsive to the presence of the temporary whitelist entry in the user's whitelist, passing any electronic mail messages from the recipient to the user without any security screening.

18. The computer program product of claim 10 further comprising:

program code for, responsive to the absence of a whitelist entry for a source in a user's whitelist, subjecting any electronic mail messages from that source to the user to security screening.

* * * * *